United States Patent [19]

Ando et al.

[11] Patent Number: 4,671,697
[45] Date of Patent: Jun. 9, 1987

[54] APPARATUS FOR MOUNTING ELECTRICAL APPLIANCE ON FRAME

[75] Inventors: Isao Ando, Nagoya; Hiroaki Tazawa, Kani; Yuji Sako, Kasugai; Shigeharu Ootsuka, Kagamihara; Yuji Mizuno; Kosaku Ikeda, both of Nagoya, all of Japan

[73] Assignee: Mitsubishi Denki Kabushiki Kaisha, Tokyo, Japan

[21] Appl. No.: 731,641

[22] Filed: May 7, 1985

[30] Foreign Application Priority Data

May 9, 1984 [JP] Japan .............................. 59-66448[U]
Jun. 29, 1984 [JP] Japan .............................. 59-97725[U]

[51] Int. Cl.$^4$ ............................................. F16B 21/00
[52] U.S. Cl. ..................................... 403/325; 403/327
[58] Field of Search ............... 403/325, 327, 326, 321, 403/328, 166; 24/656, 652, 653

[56] References Cited

U.S. PATENT DOCUMENTS

| | | | |
|---|---|---|---|
| 941,096 | 11/1909 | Pugatsky et al. ...................... | 24/656 |
| 2,142,454 | 1/1939 | Needham ............................. | 403/325 |
| 2,408,547 | 10/1946 | Bertschinger ....................... | 403/325 |
| 3,049,367 | 8/1962 | Lashta ................................ | 403/325 |
| 3,713,076 | 1/1973 | Gabrielian et al. ................. | 403/327 |
| 4,349,092 | 9/1982 | Geisthoff ............................ | 403/325 |

Primary Examiner—Cornelius J. Husar
Assistant Examiner—Peter M. Cuomo
Attorney, Agent, or Firm—Armstrong, Nikaido, Marmelstein & Kubovcik

[57] ABSTRACT

An apparatus for mounting an electromagnetic unit on a frame includes a mounting recess at the bottom of the main body of the electromagnetic unit, a guide recess which is communicated with the mounting recess at one side thereof so that it is normal to the mounting recess, and a slidable member which is slidably inserted into the guide recess and normally biased toward the mounting recess by means of a spring supported by a projection disposed in the guide recess, the improvement comprising a stopper disposed in a hole formed in the slidable member, which opposes the spring bearing in the guide recess. The stopper in the hole also serves as a spring guide. The spring is disposed between the stopper in the hole and the length a of the slidable member determined by guide projection formed at the guide recess, the movement length b of the slidable member restricted by the stopper and the projection length c of the front end of the slidable member which projects into the mounting recess is preset so that $a > b > c$.

5 Claims, 9 Drawing Figures

4,671,697

APPARATUS FOR MOUNTING ELECTRICAL APPLIANCE ON FRAME

BACKGROUND OF THE INVENTION

The present invention relates to an apparatus for mounting on a frame an electrical appliance such as electromagnetic contactor which opens and closes an input power line for an electric motor and in particular to an apparatus for mounting on a frame an electrical appliance in which a slidable member which is fitted in a guide recess formed on an attachment surface of the appliance is biased by the biasing force of a biasing spring for securing the frame on the attachment surface of the appliance.

A prior art electromagnetic contactor is often used in such a manner that it is mounted on a frame at a predetermined elevation in a house. An example of a conventional electromagnetic contactor is illustrated in FIGS. 1 to 3.

FIG. 1 is a bottom view showing a conventional electromagnetic contactor. FIG. 2 is a sectional view taken along the line II—II in FIG. 1. FIG. 3 is a schematic view showing the essential part of the contactor.

In the drawings, a main body 1 of an electromagnetic relay is provided with a mounting recess 2 for mounting on a frame 13 at the bottom thereof, which will be described hereafter. At one side of the mounting recess 2 are formed a plurality of engagement projections 3 and 3a which project in opposite inner directions. At the side of the mounting recess opposite to the engagement projections 3 and 3a are formed a guide recess 4 which is normal to the mounting recess 2. A pair of guide projections 5 and 5a which project from the opposite sides of the guide recess 4 in opposite inner directions at a position close to the side of the mounting recess 2. A projection 6 which projects in a downward direction at a mid position between the sides of recess 4 and in the vicinity of an end of the recess 4 opposite to the mounting recess 2. A slidable member 7 which is substantially T-shaped is slidably fitted into the guide recess 4 and is provided with a rectangular hole 8 at the center thereof, said hole 8 extending through the member 7. The hole 8 is provided with a spring stopper 9 at a front end side thereof. The slidable member 7 includes a stepped portion 10 which is to be engaged with the frame 3, a spring 12 disposed between the projections 6 and 9 and the channel shaped frame 13 having mounting projection 14 and 14a at the opposite sides thereof.

The mounting apparatus which comprises the parts mentioned-above is assembled as follows: The slidable member 7 is inserted into the guide recess 4 so that the projection 6 is fitted into the guide hole 8. The slidable member 7 is furthermore inserted until the front end thereof is positioned between the guide projections 5 and 5a. A coil spring 12 is disposed between the projections 6 and 9. This causes the slidable member 7 to be biased and slide in a direction designated by an arrow A by a coil spring 12 until a shoulder abuts on the outer wall of the main body of the electromagnetic contactor. At this time, the front end of the slidable member 7 is projected into the mounting recess 2 so that the engagement portion 10 is substantially aligned with the mounting recess 2.

In order to mount the electromagnetic contactor on the frame 13, the slidable member 7 is first slid in a direction of an arrow B against the force of the coil spring 12. The frame 13 is fitted into the mounting recess 2 with the engagement flanges 3 and 3a being engaged with the mounting projections 14 and 14a of the frame 13. If the slidable member 7 is released under such position, the slidable member 7 is slid in a direction of the arrow A by being biased by the coil spring 12. The engagement portion 10 of the member 7 is brought into engagement with the other mounting projection 14a of the frame 13 so that the electromagnetic contactor is firmly secured to the frame 13.

Since the length of the coil spring 12 is short in the afore-mentioned mounting apparatus, the guide length a determined by the outer side of the guide projections 5 and 5a in the guide recess 4 and the front end of the slidable member 7 and the movement length b of the slidable member 7 have a relation $a<b$. Accordingly the slidable member 7 is readily separated from the engagement projections 5 and 5a when the slidable member 7 is slid in a direction of arrow B. If the slidable member 7 is escaped from the guide recess 4, small parts would be scattered so that it would not only take a long period of time to find them, and it is also very troublesome to assemble them since the coil spring 12 is small. In order to solve such problem, it may be proposed that the length of compressed coil spring 12 be made longer and movement length b of the slidable member 7 be made shorter so that $a>b$. However this makes it difficult to mount the coil spring 12 and involves a high cost.

SUMMARY OF THE INVENTION

It is an object of the present invention to provide an apparatus for mounting an electrical appliance on a frame, which is free of the afore-mentioned disadvantages in which drop off of the slidable member is prevented and it is easy to mount the spring.

The object of the present invention can be accomplished by providing an apparatus for mounting an electromagnetic unit on a frame including a mounting recess at the bottom of the main body of the electromagnetic unit, a guide recess which is communicated with the mounting recess at one side thereof so that it is normal to the mounting recess, and a slidable member which is slidably inserted into the guide recess and normally biased toward the mounting recess by means of a spring supported by a projection disposed in the guide recess the improvement comprising a stopper disposed in a hole formed in the slidable member, which opposes the projection in the guide recess, said stopper in the hole also serving as a spring guide, the spring being disposed between the stopper in the hole and the projection on the guide recess, the relation among the guide length a of the slidable member determined by guide projection formed at the guide recess, the movement length b of the slidable member restricted by the stopper and the projection length c of the front end of the slidable member which projects into the mounting recess is preset so that $a>b>c$.

DETAILED DESCRIPTION OF THE PREFERRED EMBODIMENTS

Preferred embodiments of the present invention will be explained.

Figure 1:
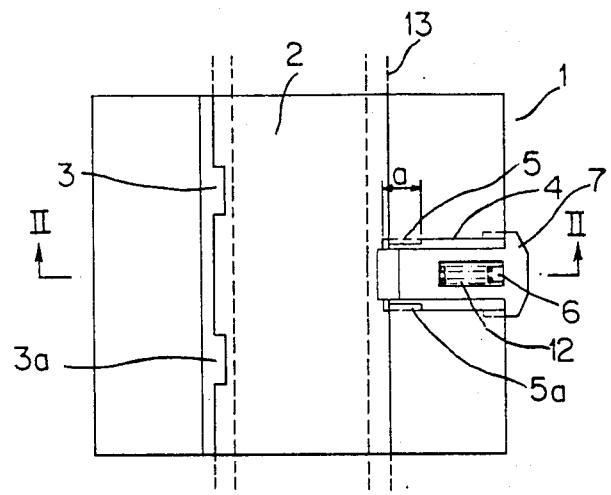
FIG. 1 is a bottom view showing a conventional electromagnetic contactor.
Figure 2:
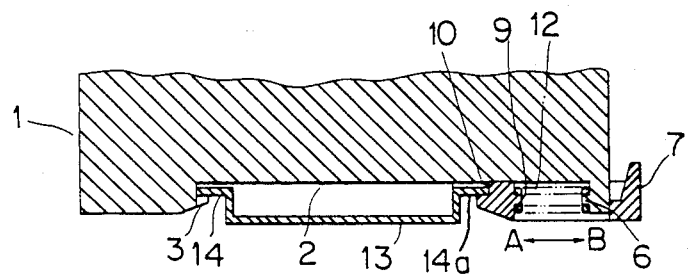
FIG. 2 is a sectional view taken along the line II—II in FIG. 1.
Figure 3:
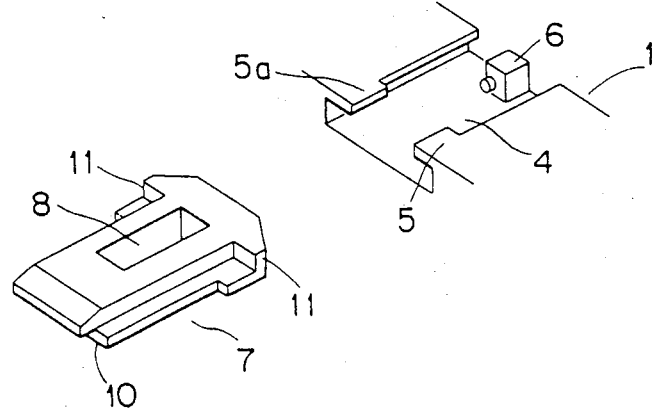
FIG. 3 is an exploded perspective view showing the essential parts of the electric contactor.
Figure 4:
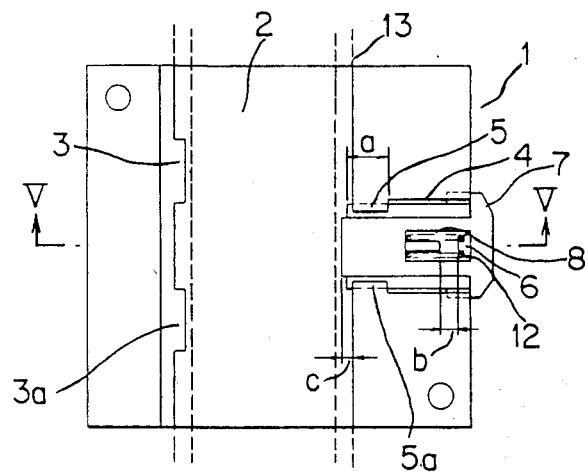
FIG. 4 is a bottom view showing an embodiment of an electromagnetic contactor of the present invention.
Figure 5:
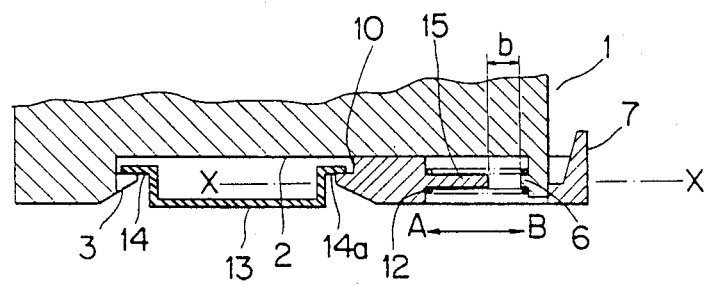
FIG. 5 is a sectional view taken along the line V—V of FIG. 4.

FIG. 4 is a bottom view showing an example of an electromagnetic contactor of the present invention. FIG. 5 is a sectional view showing the electromagnetic contactor in which a part thereof is omitted. The parts which are identical with or relevant to those of the prior art of FIGS. 1 to 3 are designated by like reference numerals and the description thereof will be omitted. In accordance with the present invention, an elongated stopper 15 which also serves as a spring guide is provided in lieu of the projection 6 with the hole 8 of the slidable member 7. A coil spring 12 is interposed between the stopper 15 and the projection 6 in the guide recess 4. Accordingly when the engagement 10 at the front end of the slidable member 7 is separated from the mounting flange 14a of a frame 13 by being slid in a direction of arrow B, the front end of the stopper 15 will abut on the projection 6 and the slidable member 7 cannot furthermore move in a direction of arrow B. Since the slidable member 7 is guided by the guide projections 5 and 5a of the guide recess 4 at this time, there is no fear that the slidable member 7 will be dropped off from the guide recess 4. That is, the present invention presets the relation between the guide length a of the guide recess 4 and the movement length b of the slidable member 7 (that is, the length between the projection 6 and the stopper 15 when the main body is mounted on the frame 13) to be a>b by means of the stopper 15 and the relation between the movement length b of the slidable member 7 and the projection length c of the front end of the slidable member 7 projected into the mounting recess 2 when the main body is mounted on the frame 13 to be b>c.

It is apparent from the description hereabove that there is no fear that the slidable member will be dropped off from the guide recess. Accordingly this results in no posibility of scattering of small parts. Since the coil spring having a long length at compressed condition may be used and the stopper may be also used as a guide for mounting the coil spring, the mounting is easy.

By the way, it is not readily determined which one of open mold halves the slidable member 7 is adhered to when the slidable member, a molded article of synthetic resin is removed from the mold after molding since the slidable member 7 used for the mounting apparatus in the aforementioned embodiment is symmetrical in upper and lower shape with respect to boundary line X—X. Accordingly feeding process for feeding the slidable member 7 which has been removed from the mold to a next station cannot smoothly be carried out. This should be improved. Furthermore burr is formed on the outer surface of the stopper 15. Forming the hole 8 simultaneously with the stopper 15 requires a complicated, joint between the upper and lower mold halves, resulting in a thin portion. There is a fear that the mold will break. Furthermore there is a need that positioning of the compressed coil spring 12 in the hole 8 having a small diameter may be carried out in easier manner when the slidable member 7 is provided on the bottom of the electromagnetic contactor body 1, which is a mounting surface.

Figure 6:
FIG. 6 is a plan view showing a slider.
Figure 7:
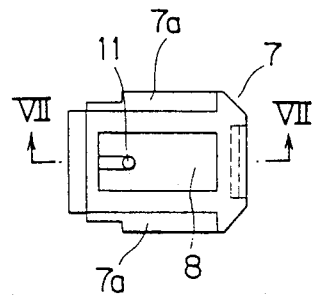
FIG. 7 is a sectional view taken along the line VII—VII of FIG. 6.

FIGS. 6 to 9 shows another embodiment of the mounting apparatus which has been improved in consideration of the afore-mentioned difficulties. This embodiment will be described with reference to the FIGS. 6 to 9 in which like parts are designated by like reference numerals used in the former embodiment. FIG. 6 is a plan view showing the slidable member 7 used for the mounting apparatus of the present invention, FIG. 7 is a sectional view taken along the line VII—VII of FIG. 6. In FIG. 7 an L-shaped stopper 15 is integrally formed on the peripheral wall of the hole 8 of the slidable member 7, the free end of the slidable member 7 being in parallel with the periphery of the hole 8. The bend base 15a of the L-shaped stopper 15 may be made thin so that the stopper can be readily bent. The slidable member 7 shown in FIGS. 6 and 7 is identical with that shown in FIGS. 4 and 5 in structure except for the L-shaped stopper 15.

Figure 8:
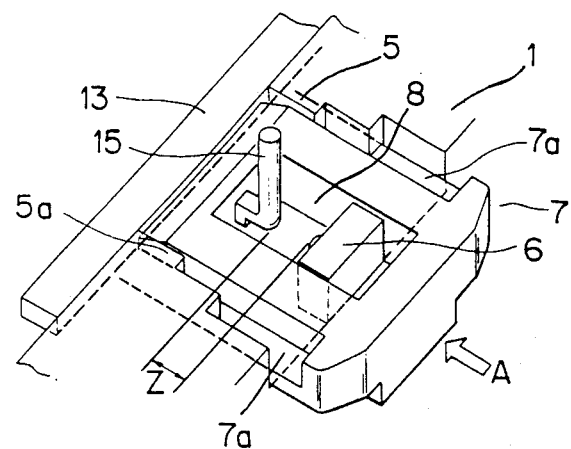
FIG. 8 is an enlarged perspective view showing the bottom of the electric contactor.

In order to mount the slidable member 7 of FIGS. 6 and 7 on the mounting surface of the electromagnetic contactor body 1, the slidable member is set to a position of FIG. 8. In this case the distance Z between the L-shaped stopper 15 and the projection 6 fitted in the hole 8 is long since the tip end of the L-shaped stopper 15 is disposed in vertical and in parallel with the periphery of the hole 8. Accordingly it is easy to set the slidable member 7 to a position shown in FIG. 8.

Figure 9:
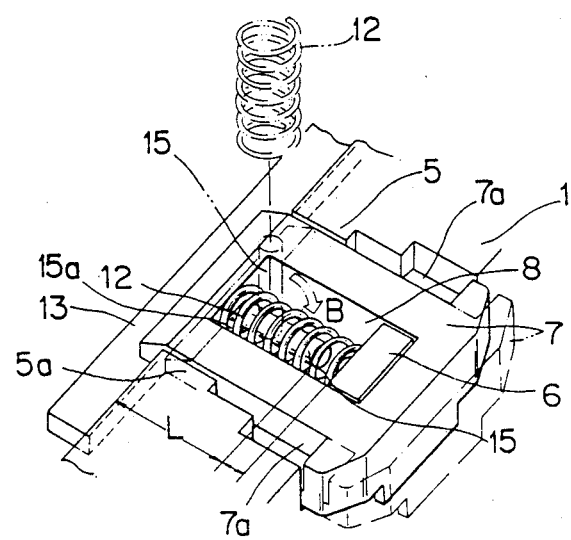
FIG. 9 a view explaining the assembly of the parts shown in FIG. 8.

The coil spring 12 is fitted to the L-shaped stopper 15 after the slidable member 8 has been moved from a position of FIG. 8 to a position of FIG. 9 in a direction of arrow A. The spring 12 is received in the hole 8 by bending the L-shaped stopper 15 to a straight manner in a direction of arrow B while it is compressed. This completes mounting of the slidable member 7 on the electromagnetic contactor.

The L-shaped stopper 15 is arranged in such a manner that the relation between 1 and L, 1 being the distance between the tip end of the stopper 15 and the spring bearing 6 and L being the engagement length of the projection 7a of the slidable member 7 with the guide projections 5, 5a satisfies the condition L>1 when the L-shaped stopper 15 is at a straight position. Accordingly the slidable member 7 is prevented from being moved in a direction opposite to the direction of arrow A so that the slidable member is positively prevented from being dropped off. Even if the L-shaped stopper 15 should be broken when it is bent to a straight position, the opposite ends of the spring 12 are engaged with the projection 6 and the thin base of the stopper, preventing it from being dropped. This does not give any adverse influence upon the drop off prevention effect of the stopper on the slidable member.

The body 1 of the electromagnetic contactor is removably mounted on a frame in a ready manner by moving the slidable member 7 to a position designated with chained line in FIG. 9 against the coil spring 12.

Although the guide projections 5 and 5a are formed on the mounting surface of the electromagnetic contactor body 1 as slide guide portions in the shown embodiment. They may be in the form of projection ribs and channels may be formed on the slidable member 7.

The slidable member 7 is positively adhered to one of mold halves which have formed an L-shaped stopper 15 when the upper and lower mold halves are opened after molding if the slidable member is molded of synthetic resin since the L-shaped stopper 15 having a free end outwardly projecting from the hole 8 is integrally formed on the peripheral wall of the hole 8 in accordance with the embodiment shown in FIGS. 6 to 9. This can make smooth the feed process for feeding the slidable member removed from the mold to a next step. The configuration of the joint between upper and lower mold halves is simplified and the break of the mold is reduced, providing an improved moldability of the slidable member.

Furthermore the L-shaped stopper 15 provides a longdistance between the stopper 15 and the projection 6, resulting in easy setting of the slidable member 7 on the mounting surface. The coil spring 12 may be readily fitted to the pin and the slidable member may be mounted on the electromagnetic contactor 1 in very simple and quick manner by bending the stopper 15 into the hole 8 using the compression force of the coil spring 12.

The release of the slidable member 7 in a direction opposite to that of arrow A is restricted by abutment of the stopper 15 on the projection 6, whereby positively preventing the slidable member from being released.

Although the present invention has been described in relation to the electromagnetic contactor, it is apparent that the present invention is equally applicable to a mounting apparatus for electromagnetic switch, electromagnetic relay and other electrical appliances.

What is claimed is:

1. An apparatus for mounting an electrical appliance on a frame, including a mounting recess at a bottom surface of a main body of the appliance, a guide recess which is communicated with the mounting recess at one side thereof so that it is normal to the mounting recess, said apparatus comprising:
   a slidable member having a longitudinally extending aperture, said slidable member being disposed in the guide recess and slidable therein;
   a projection formed on a bottom surface of the guide recess and extending into said aperture a spring mounted within said aperture and being supported at one end by an inner surface portion of said slidable member and on its opposite end by said projection such that said slidable member is normally biased toward the mounting recess;
   a bendable, elongated stopper integrally formed on said inner surface portion of said slidable member, said stopper having an end portion extending towards said projection such that said stopper bears against said projection when said slidable member is moved against the biasing force of said spring; and
   a guide length of the slidable member determined by a distance from an open end of a guide projection formed on the main body for receiving said slidable member to an engaging end of said slidable member nearest said mounting recess, a movement length of the slidable member determined by a distance between the end portion of said stopper and said projection, and an engagement length determined by a distance from said engaging end of said slidable member which extends into the mounting recess
   wherein the distance of said guide length is greater than the distance of said movement length; and
   the distance of said movement length being greater than the distance of said engagement length.

2. The apparatus as defined in claim 1, wherein said projection is made of synthetic resin.

3. The apparatus as defined in claim 1 wherein said spring is a coil spring having a diameter smaller than that of the aperture of the slidable member.

4. The apparatus as defined in claim 1, wherein said stopper is integral with the slidable member and being formed in a single piece by integral molding of synthetic resin, the stopper and being bendable outwardly from the aperture at a position along the length of the stopper and bendable inwardly again to be straight once said spring has been positioned around said stopper, such that said spring is resiliently retained between the spring bearing and the stopper.

5. The apparatus as defined in claim 4, wherein said stopper has a thin wall portion formed near said inner surface portion of said slidable member.

* * * * *